(12) United States Patent
Stercho

(10) Patent No.: US 6,389,054 B1
(45) Date of Patent: May 14, 2002

(54) SCRAP CHARGER

(75) Inventor: Michael J. Stercho, Wexford, PA (US)

(73) Assignee: SMS Demag Inc., Pittsburgh, PA (US)

( * ) Notice: Subject to any disclaimer, the term of this patent is extended or adjusted under 35 U.S.C. 154(b) by 0 days.

(21) Appl. No.: 09/739,851

(22) Filed: Dec. 18, 2000

(51) Int. Cl.$^7$ .................................................. F27D 3/00
(52) U.S. Cl. ............................................ 373/79; 373/81
(58) Field of Search ...................... 266/216; 164/57.1; 198/564; 373/71, 78, 79, 80, 81

(56) References Cited

U.S. PATENT DOCUMENTS

| | | | | |
|---|---|---|---|---|
| 1,338,881 A | * | 5/1920 | Stock ............................ | 373/79 |
| 1,422,135 A | * | 7/1922 | Rogatz .......................... | 373/79 |
| 3,462,538 A | * | 8/1969 | Pellegrini et al. ............. | 373/79 |
| 3,622,141 A | * | 11/1971 | Brusa ............................ | 266/216 |
| 4,023,784 A | * | 5/1977 | Wallace ........................ | 266/216 |
| 4,225,745 A | * | 9/1980 | Harwell ........................ | 373/79 |

* cited by examiner

*Primary Examiner*—Tu Ba Hoang
(74) *Attorney, Agent, or Firm*—Clifford A. Poff

(57) ABSTRACT

A scrap charging apparatus for an electric arc furnace uses a skip hoist to supply scrap to a holding bunker having diverging end walls extending between converging side walls. The containment space for the scrap is increased by this wall arrangement and provides an impetus in the bunker for scrap flow to an underlying scrap delivery chute. The scrap delivery chute is formed by an elongated scrap carrying trough having a greater width than the exit width of the scrap holding bunker for delivering scrap to a charging opining for an electric arc furnace A superstructure supporting the scrap holding bunker at an elevated and lateral spaced location from the electric arc furnace. A ram controlled by a drive incrementally advances scrap along the scrap delivery chute for introducing successive preselected volumes of scrap to a charging opining for an electric arc furnace.

14 Claims, 5 Drawing Sheets

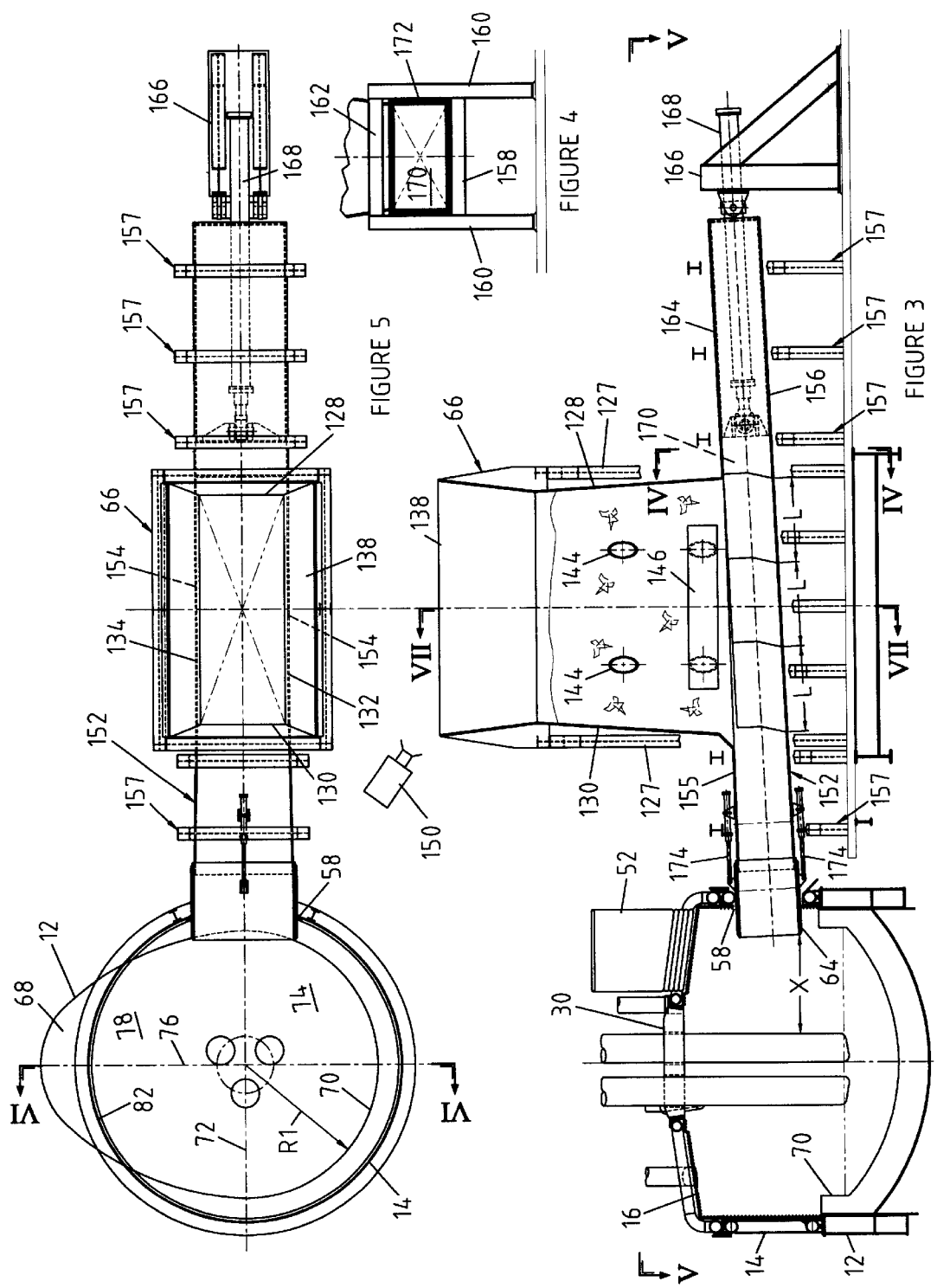

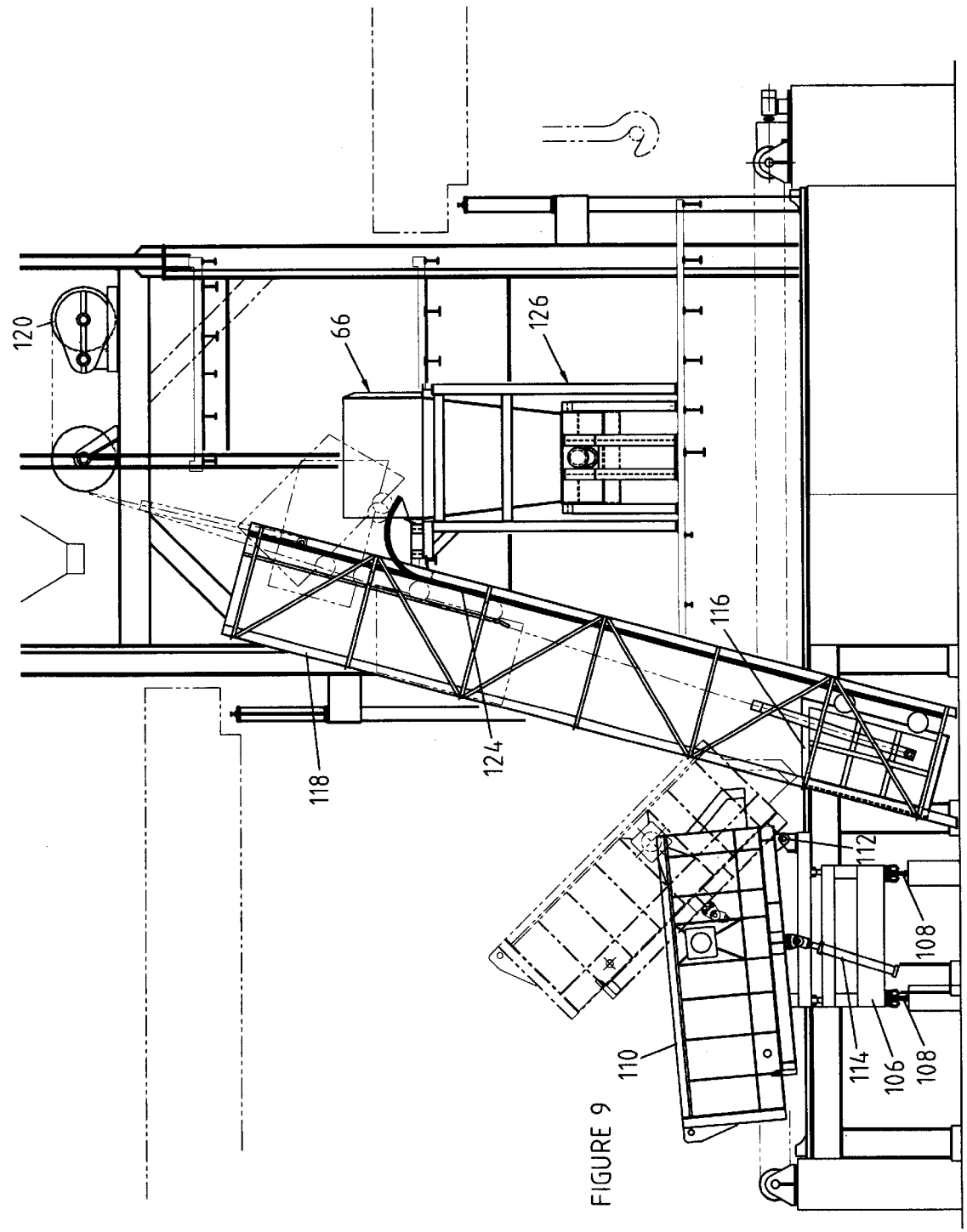

SCRAP CHARGER

CROSS REFERENCE TO RELATED APPLICATIONS

The present invention related to patent application Ser. No. 09/737,440 filed Dec. 13, 2000 entitled Electric furnace of steel making; and patent application Ser. No. 09/738,095 filed Dec. 16, 2000 entitled Revamping of a basic Oxygen furnace installation to provide an electric furnace facility.

BACKGROUND OF THE INVENTION

1. Field of the Invention

The present invention relates to a scrap charging apparatus for an electric furnace used in a steel making process and more particularly, to such an apparatus embodying a construction and an arrangement of component parts to minimize the requirement of floor space in a steel making and passage of the scrap into a furnace in an incremental fashion to maintain flat bath operation by the furnace.

2. Description of the Prior Art

The charging of scrap into an electric furnace, particularly in an electric arc furnace, may be carried out by the use of sequential use of conveyors delivering the scrap from a remote storage area to the furnace. The scrap is allowed to fall through the top of the furnace after removal of the furnace roof and electrodes from the furnace interior. Many tons of scrap will be charged and impact with the refractory lining of the furnace cannot be avoided requiring repair to the damage refractory. The conveyors require a continuous presence along a usually extensive course of travel by the scrap. Conveyors must be of a heavy duty construction to rapidly transport the scrap need for a service charge and also to withstand the intense heat flowing from the top of the furnace. The use of a large liquid metal heel at the end of tapping of the furnace to promote flat bath furnace operation would be undesirable because splashing of the liquid metal as the scrap impacts with the liquid metal. Well drastically shortening the life of the furnace side walls, therefor it is usual to reestablish a liquid metal bath by melting scrap by using heat provided by the operation of the electrodes. As the scrap melts about the electrodes, cold spots form outwardly from the electrodes from which eventually cave in and instances fall against the electrodes causing electrode damage.

Accordingly, it is an object of the present invention to provide a scrap charge for an electric steel making furnace to charge scrap in a generally horizontal direction form a bunker to the furnace.

It is another object of the present invention to provide a skip hoist system to load a scrap charging bunker for reducing the requirement of floor space about an electric steel making furnace.

It is a further object of the present invention to provide a scrap storage bunker including diverging end wall communicating with an underlying scrap charging chutes having walls that enlarge the cross sectional are in the chute in the direction to an electric steel making furnace to maintain un impeded flow of scrap by the even increasing size of the scrap conducting space.

It is a further object of the present invention to provide a generally horizontal scrap charging chute communicating with a retractable fluid cold chute extending into the interior of an electric steel making furnace to establish a scrap fall space with a bath of liquid steel remaining the furnace after tapping.

BRIEF SUMMARY OF THE INVENTION

According to the present invention there is provided a scrap charging apparatus for an electric arc furnace, the apparatus including the combination of a scrap holding bunker having diverging end walls extending between converging side walls, the scrap burden along boundaries formed by the diverging end walls providing an impetus in the bunker for scrap flow to an underlying scrap delivery chute, the scrap delivery chute defining an elongated scrap carrying trough having a greater width than the exit width of the scrap holding bunker for delivering scrap to a charging opining for an electric arc furnace, a superstructure supporting the scrap holding bunker at an elevated and lateral spaced location from an electric arc furnace, a ram controlled by a drive to incrementally advance scrap along the scrap delivery chute for introducing successive preselected volumes of scrap to a charging opining for an electric arc furnace, and a conveyor for supplying scrap to the scrap holding bunker.

BRIEF DESCRIPTION OF THE SEVERAL VIEWS OF THE DRAWINGS

The present invention will be more fully understood when the following description is read in light of the accompanying drawings in which:

FIG. 3 is a side elevational view taken along lines III—III of FIG. 2;

FIG. 4 is a sectional view taken along lines IV—IV of FIG. 3;

FIG. 5 is a plan view taken along lines V—V of FIG. 3;

FIG. 9 is a elevational view taken along lines IX—IX of FIG. 2.

DETAILED DESCRIPTION OF THE INVENTION

Figure 1:
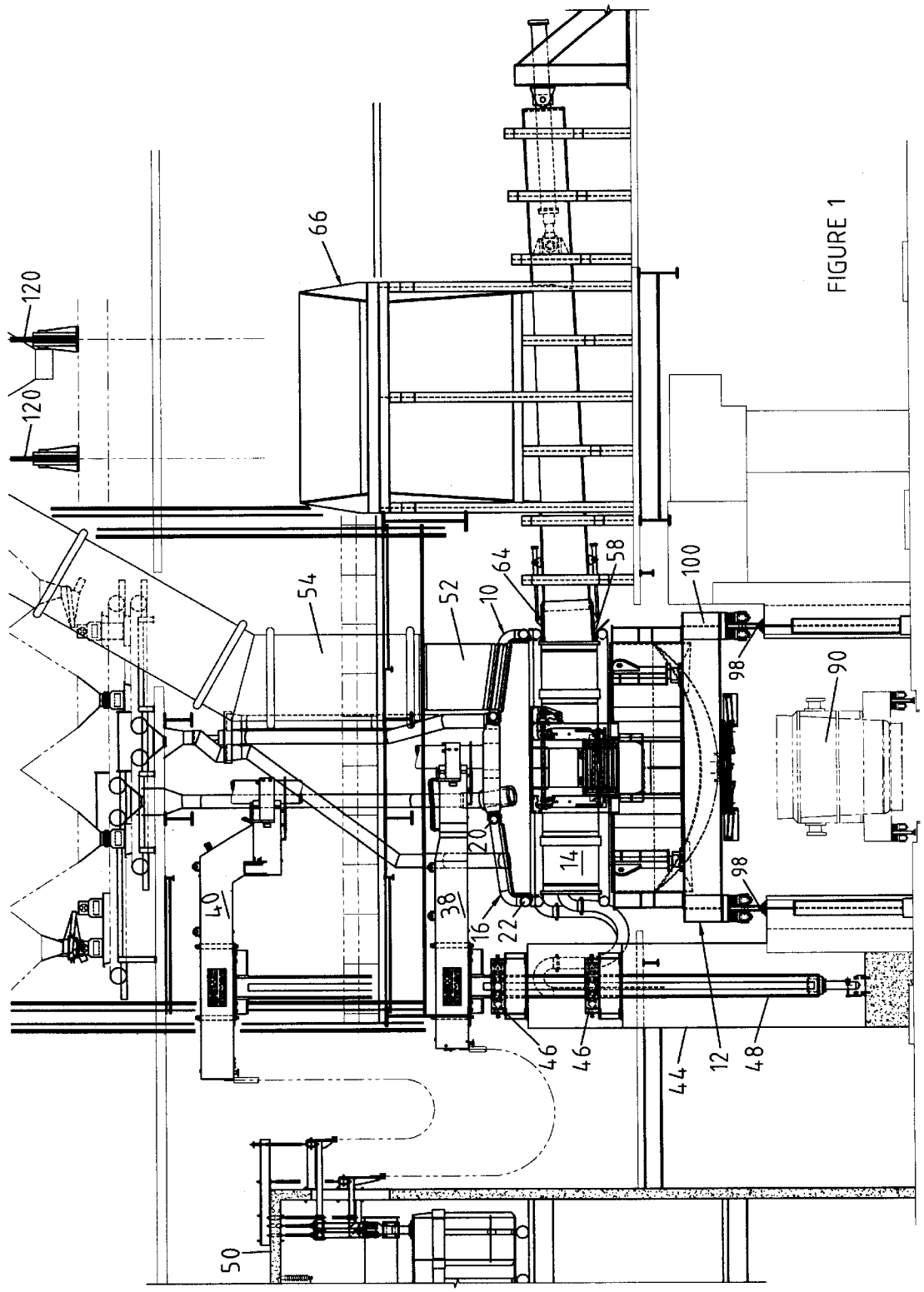
FIG. 1 is a front elevational view of an electric arc furnace installation embodying the features of a scrap charger according to the preferred embodiment of the present invention.
Figure 2:
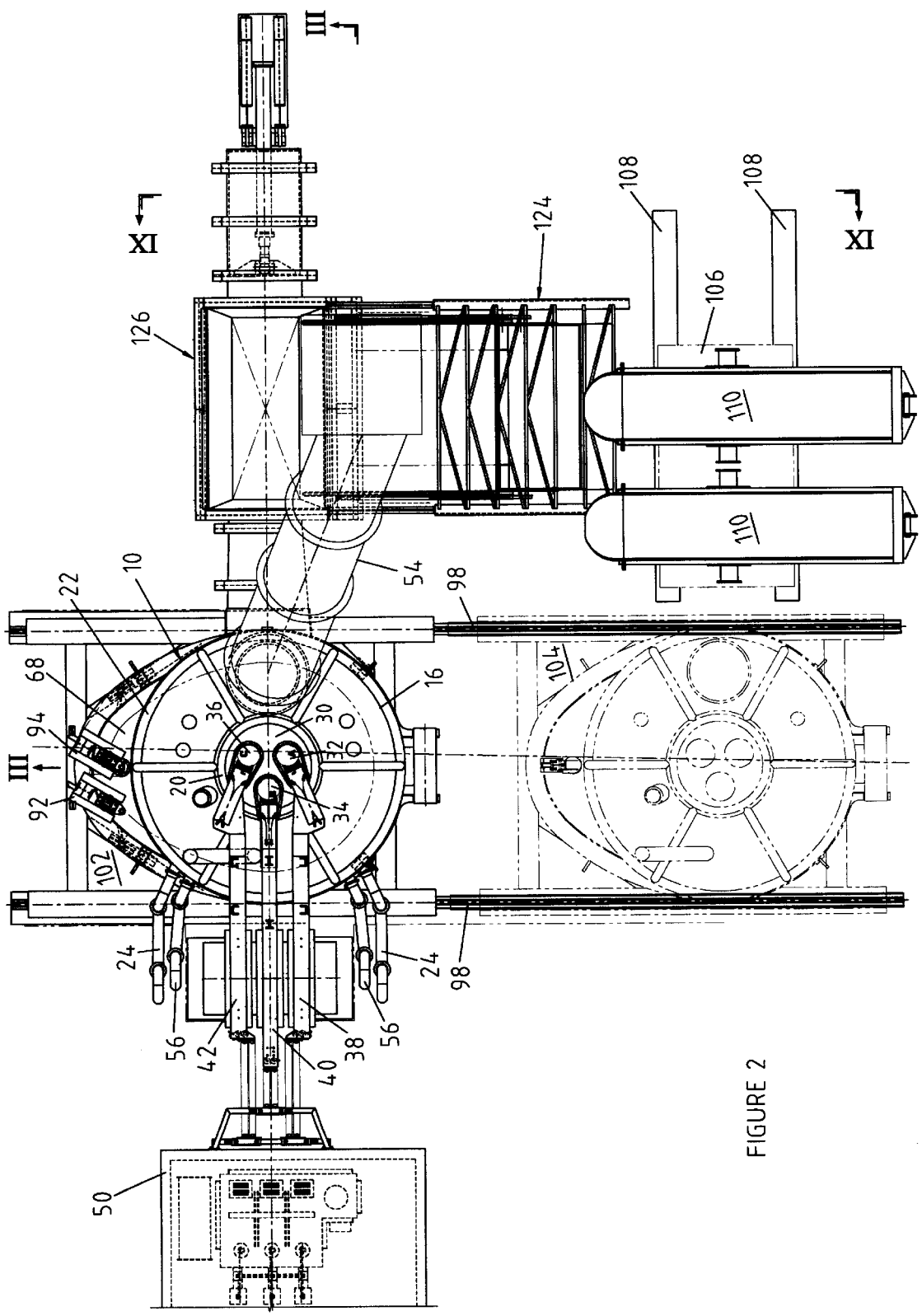
FIG. 2 is a plan view of the electric arc furnace installation shown in FIG. 1.

There is illustrated in FIGS. 1 and 2 a preferred form of an electric furnace facility for use with the scrap charging apparatus of the present invention. The furnace facility includes an electric arc furnace 10 formed by a lower furnace shell 12, an upper furnace shell 14 and a furnace roof 16. The furnace roof 16 includes roof panels formed by an array of side-by-side coolant pipes with the coolant passageways communicating with annular upper and lower water supply headers 20 and 22, respectively, interconnected by radial distributing pipes to form a water circulating system communicating with service lines 24 containing water supply and return lines. The service lines 24 include flexible sections to avoid the need to disconnect the service lines when it is desired to lift the furnace roof alone or combined with the upper furnace shell a short distance, e.g., 24 inches, for servicing the lower furnace shell. The upper water supply header 20 encircles a triangular array of three apertures in a roof insert 30. The apertures are dimensional and arranged to accept the phase A, B and C electrodes 32, 34 and 36 carried by electrode support arms 38, 40 and 42, respectively. Each of the electrode support arms is independently positioned vertically by a support post 44 restrained by horizontally spaced guides 46 in a superstructure for vertical displacement by actuator 48 typical in the form of piston and cylinder assembly. The electrode support arms also support water cooled cables for transmission of electrical current from transformers in a transformer vault 50 to the respective phase A, B and C electrodes.

A fume duct 52 extends vertically from an annular opening in the furnace roof 16 between the upper and lower water supply headers 20 and 22 for exhausting the fume from the interior of the furnace to an enlarged and vertically spaced overlying duct 54 formed by water coolant piping cool the fume and to provide thermal protection. The duct 54 supplies the exhaust fume to an evaporator chamber and filter equipment, not shown, to recover pollutants.

Vertically extended legs, not shown, at annular spaced apart intervals form lateral roof restraints for maintaining a desired superimposed relation of the furnace roof 16 on the furnace upper shell 14. The furnace upper shell includes superimposed convolutions of coolant pipe supplied with coolant from spaced apart supply headers that are interconnected by vertical distribution pipes to form a water circulating system communicating with service lines 56 containing water supply and return lines. Metal panels may be supported by the coolant pipe of the furnace roof and the coolant pipe of the furnace upper shell for confinement of the fume to the interiors of these furnace components. The service lines 56 include a flexible section to avoid the need to disconnect the service lines when it is desired to lift the furnace roof combined with the upper furnace shell a short distance, e.g., 24 inches, for servicing the lower shell. The convolutions of coolant pipe are arranged to form an annular shape to the upper furnace shell interrupted by a scrap charge opening 58 in one quadrant of the shell. A slag discharge opening is closed by moveable door 60 supported by the upper furnace shell and extending to a slag discharge trough in the lower furnace shell 12. Slag passes from the furnace along the trough beyond a threshold formed by carbon rod insert 62 which is supported by suitable brackets on the lower furnace shell 12. The scrap charge opening 58 is provided to introduce quantities of scrap at closely spaced apart time intervals throughout the major portion of the furnace operating cycle.

Scrap residing in a retractable chute 64 in a constant communication with the interior of the furnace of a scrap charger 66 serves as a media to prevent unwanted escape of the fume from the furnace into the scrap charger.

The upper furnace shell 14 includes a circular ring, not shown, forming a lower boundary to the shell except where a gap exists at the slag discharge opening. Apertures in the circular ring are provided at annular spaced locations to receive upstanding locator pins on annular segments at opposite lateral sides of the lower furnace shell 12. These annular ring segments are discontinuous at the slag discharge trough and at a bottom crescent-shaped section protruding in an eccentric fashion from the annular configuration of the overlying upper furnace shell 14. The crescent-shaped bottom section is enclosed by a correspondingly shaped crescent roof section 68. The crescent-shaped roof is formed by a layer of coolant pipes. The crescent-shaped bottom section is used to provide eccentric furnace tapping and is combined with the construction and operation of the lower furnace shell to achieve the benefits of flat bath operation and slag free tapping.

Figure 6:
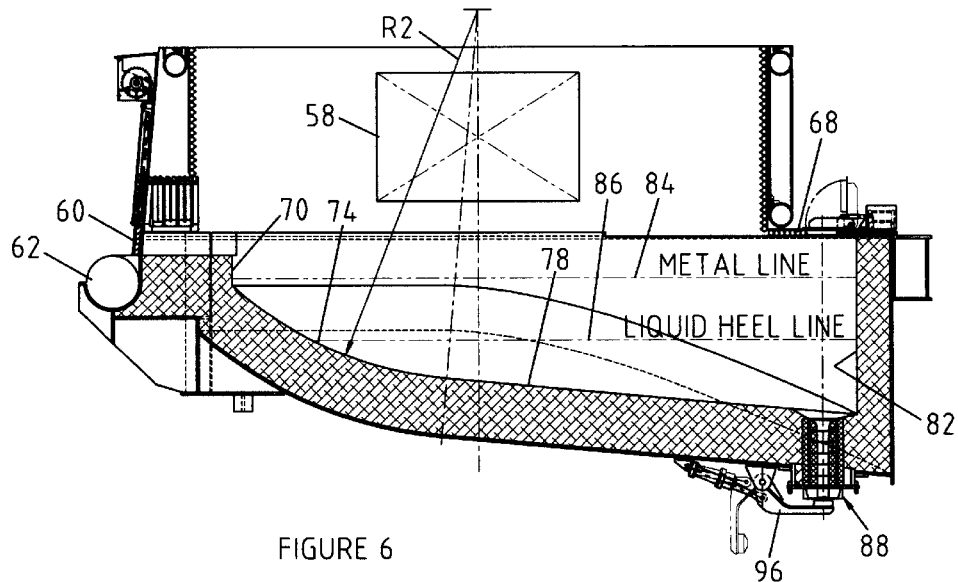
FIG. 6 is a sectional view taken along lines VI—VI of FIG. 5.

The preferred form of the electric arc furnace has a configuration of the refractory face surfaces in the lower furnace shell 12 for supporting a metal charge during refining of a steel heat and providing eccentric bottom tapping of the steel heat. As seen in plan view of FIG. 3, there is annular side wall section 70 in an area bounded by a diameter 72 with a radius R1 struck from the center of the diameter 72. As seen in the sectional views of FIG. 6, the annular vertical side wall section 70 is bounded by a spherically-dished floor wall section 74 defined by a radius R2 struck form a point along a line defined by intersecting vertical plane 76 containing the center of the diameter 72. Plane 76 is a plane of symmetry of the configuration to the lower furnace shell. A floor wall section 78 begins at a vertical plane containing diameter 72 and proceeds away from the spherically-dished floor wall section 74 by a linear downward-sloping contour along plane 76 with an ever increasing radius of curvature transverse to plane 76 forming a rolled developed plate floor wall configuration. The ever increasing radius of transverse curvature of the floor wall section 78 results in an ever increasing height to the vertical side wall 82 as can be seen in FIG. 6. The vertical side wall sections 70 and 82 forms a vertical boundary to the liquid metal surface commonly called a hot metal line 84 at the start of tapping a heat. At the conclusion of the tapping of the steel heat, there is a liquid heel line 86 formed by the upper surface of the steel heat and represents a reduction to the liquid metal depth at the diameter 72 typically slightly less than one-half of the depth of the steel heat than at the start of tapping. At the site of the sectional view of FIG. 6, the vertical side wall 82 is of maximum height and merges with floor wall section 78 along plane 76 at the site of a tap hole assembly 88. The furnace is operated in a manner to always maintain a liquid heel depth, at the end of tapping, overlying the tap hole of at least three times the diameter of the tap hole during the useful life the tap hole ceramic discs. Additionally, the size of the heel at the end of tapping is at least 70% of the tapped heat preferably 100% so that the introduction of scrap into the furnace may be accomplished in an incremental fashion using the thermal energy of the heel and the continuous operation of the electrodes for maintaining flat bath operation. At the conclusion of the tapping of a heat into an underlying ladle 90 supported by a transfer car one of two transfer stopper assemblies 92 and 94 is used to fill the tap hole with sand and promptly thereafter a tap hole gate, not shown, is positioned to close off the bottom of the tap hole assembly. An emergency tap hole closure assembly 96 is shown in FIG. 6 in the event the tap hole gate malfunctions.

Figure 7:
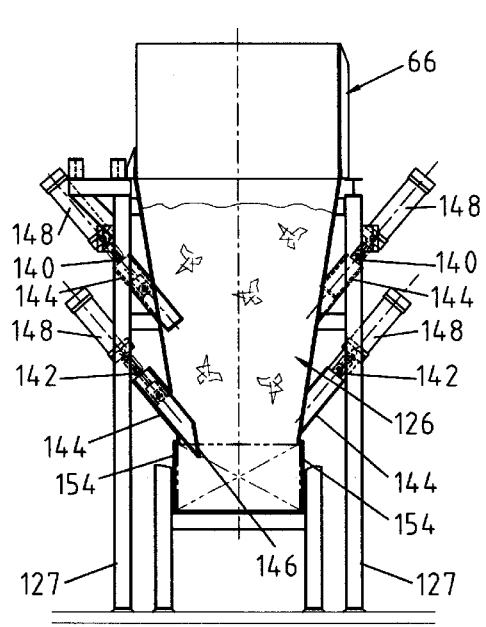
FIG. 7 is a sectional view taken along lines VII—VII of FIG. 3.

Referring again to FIGS. 1 and 2, it can be seen that rails 98 extend along opposite sides for the rails of the transfer car for the ladle 90. The rails 98 support a furnace transfer car 100 used to support the lower furnace shell and the upper furnace shell and roof in a superimposed relation. The furnace transfer car is moved along the rails 98 from furnace operating position 102 to a furnace exchange position 104 by a suitable winch assembly. The furnace remains statically positioned throughout repetitive furnace operating cycles at the furnace operating position 102. The charging of scrap therefor is preferably accomplished by the introduction of scrap through the side wall of the upper furnace shell although the scrap charger of the present invention is equally useful to charge scrap into an electric arc furnace that tilts in opposite directions for slagging and tapping. In both cases tilting furnace arrangement and the static operating arrangement, charging maybe accomplished through the top of the furnace exposed by removal of the furnace roof The scrap charger 66 according to the preferred form of the present invention includes a scrap charging car 106 supported on rails 108 and carrying side-by-side scrap boxes 110. As best shown in FIG. 9, each scrap box is mounted by pivot shaft 112 to the scrap charging car and a piston and cylinder assembly 114 mounted on the car and joined with the respective scrap boxes by a clevis mounting for tilting a scrap box to discharge scrap into a car 116 forming part of a skip hoist 118. A winch 120 is provided drum portion cables connected to the skip hoist car 116 draws the car laden with scrap along a skip hoist frame 122 to a point where support rails 124 for the car curve downwardly and serve to discharge the scrap content into a scrap holding bunker 126. The bunker is supported by a super structure 127 to extend to an elevation laterally spaced from the scrap charging opening 58 in the electric furnace. The volume of scrap in scrap holding bunker is contained by diverging end walls 128 and 130 extending between opposed side walls that 132 and 134 converge in the direction toward a bunker discharge opening 136. The bunker side wall 128, 130, 132 and 134 support an overlying scrap guide section 138. As shown in FIGS. 3 and 7, the converging side wall 132 and 134 each have pairs of upper and lower scrap shover rams 140 and 142, respectively. Each scrap shover ram is guided by a guide trough 144 angularly positioned in the respective side walls of the bunker and advanced from a start position to a scrap engaging position where the ram juts from the guide trough in response to operation of a piston and cylinder assembly 148. The lower pairs of rams 142 in each side wall are interconnected by a plate 146 to increase the working area of the scrap shover rams. The flow of scrap in the bunker is monitored by a video camera 150. The diverging end wall provides an impetus for scrap flow in the bunker to an underlying scrap delivery chute 152 which as shown in FIGS. 4, 5 and 7 have side walls 154 spaced apart at a distance which is greater than the width of the bunker discharge opening 136 of the bunker to promote scrap flow into the delivery chute. The chute is closed by an upwardly diverging top wall section 155 extending between diverging end wall 130 of the bunker and retractable chute 64. The delivery chute further includes a downward diverging continuous floor wall 156 supported by spaced apart cradle supports 157. The cradle support includes a transverse carrier beam 158 joined with post members 160 extending from the floor upwardly along the side walls 154 to a point where a cross beam 162 interconnects the post members 160 and provides a stable cradle support structure. The elevations of the transverse carrier beams 158 change at each support site along the length of the chute 152 thereby positioning the chute in a downwardly angled fashion so that gravity contributes to scrap flow along the chute. A top wall section 164 closes off the top of the chute between the diverging end wall 128 of the scrap holding bunker 128 to the remote end of the chute where an upstanding anchor 166 is provided with a clevis mounting for supporting the cylinder member of a piston and cylinder assembly 168. The rod end of the piston and cylinder assembly 168 is mounted to a pusher block 170 and forming an end wall to a pusher ram 172 made up of side walls, top walls and floor walls surrounding the entire length of the piston and cylinder assembly 168. The pusher ram is incrementally advanced along the scrap delivery chute 152 to advance a predetermined volume of scrap into the furnace. Scrap is charged into the furnace at closely space intervals commencing with the end of the tapping of a heat and extending to a short period, e.g., three minutes, before tapping of the next heat. The static placement of the furnace throughout consecutive operating cycles allows the retractable chute 64 to extend through the charging open 58. The rod ends of piston and cylinder assemblies 174 are mounted on the retractable chute. The cylinder members of the piston and cylinder assemblies 174 are mounted on the top wall 155 and floor wall 156 of the chute. The piston and cylinder assemblies 174 are operated when it is desired to withdraw the chute 164 from the charging opening such as for moving the lower or upper and lower furnace shells to the furnace exchange position 104. The piston and cylinder assemblies 174 position the retractable chute to project into the furnace by a distance sufficient so that the chute traverses the refractory forming the vertical wall in the lower furnace shell. The retractable chute is constructed from convolutions of coolant pipes joined together in an edge-to-edge relation. Coolant water is continually circulated through the pipes to prevent destruction while residing in the highly heated environment in the furnace. The extent to which the chute projects into the furnace is selected to assure scrap will fall directly into the liquid metal bath and not impact with the refractory of the side wall. Further, the volume of scrap introduced during each push cycle by the rain is predetermined to prevent damaging impact with electrodes 32, 34 and 36 and maintain flat bath operation by the furnace.

Figure 8:
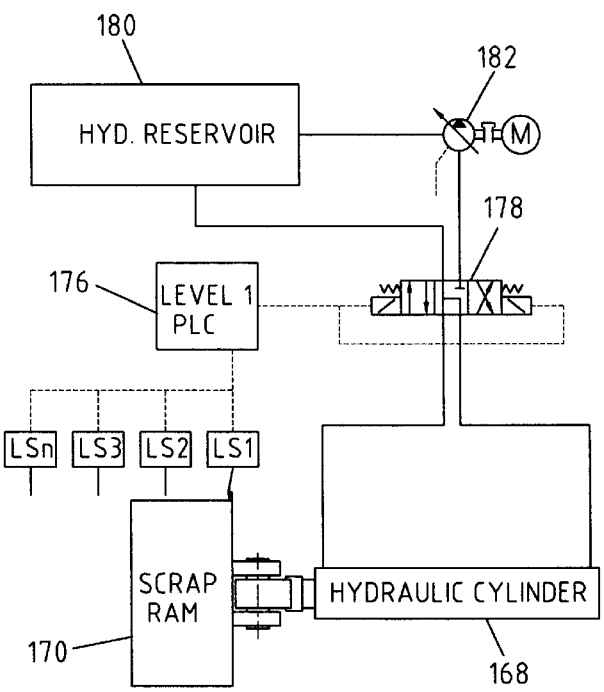
FIG. 8 is a schematic illustration of a hydraulic control circuit for the scrap charging rain.

FIG. 8 schematically illustrates a control for the piston and cylinder assembly 168 and includes limit switches LS1, LS2, LS3 . . . LSN placed at equally spaced intervals along the side wall 154 of the underlying scrap delivery chute 152 within boundaries formed by the diverging end wall 128 and 130 of the scrap storage bunker. A signal provided by the limit switches is delivered to an actuator 176 for a hydraulic control valve 178 supplied with pressurized hydraulic fluid from a reservoir 180 by a motor driven pump 182. The distance separating the limit switches forms the incremental length "L" of an individual scrap charge. The length "L" is always less than the distance "X" corresponding to the linear length of the fall space between the end of the moveable chute in the furnace and the vertical wall of an electrode most adjacent the chute as shown in FIG. 3. While the limit switches LS1, LS2, LS3 . . . LSN have been selected for the purpose of detecting the advanced positions of the rams, other devices maybe used for this purpose without departing from the present invention. One such form of another device is a detector responsive to displacement of a linear scale by movement of the ram 170. The rain has an elongated length sufficient to traverse the distance between the end walls 128 and 130 of the scrap holding bunker 126. When the pusher block 170 passes beyond wall 130, the ram is retracted to a start position residing below roof 157 to allow scrap to flow into the chute from the overlying bunker. In the unlikely event of a blockage to the downward migration of the scrap, one axis more of the piston and cylinder assemblies 148 are operated to cause the associated scrap shover rams to supply forces to the mass of the scrap and restart flow due to gravity.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A scrap charging apparatus for an electric arc furnace, said apparatus including the combination of:
   a scrap holding bunker having diverging end walls extending between converging side walls, the scrap burden along boundaries formed by said diverging end walls providing an impetus in said bunker for scrap flow to an underlying scrap delivery chute, said scrap delivery chute defining an elongated scrap carrying trough having a greater width than the exit width of the scrap holding bunker for delivering scrap to a charging opening for an electric arc furnace;
   a superstructure supporting said scrap holding bunker at an elevated and lateral spaced location from an electric arc furnace;
   a ram controlled by a drive to incrementally advance scrap along said scrap delivery chute for introducing successive preselected volumes of scrap to a charging opening for the electric arc furnace; and
   a conveyor for supplying scrap to said scrap holding bunker.

2. The apparatus according to claim 1 wherein said conveyor includes scrap boxes advanced on charging cars to a skip car of a skip hoist loader for supplying scrap to said scrap holding bunker.

3. The apparatus according to claim 1 wherein said conveyor includes a conveyor belt for supplying scrap to said scrap holding bunker.

4. The apparatus according to claim 1 wherein said conveyor includes scrap boxes advanced on charging cars to a scrap box dumper for supplying scrap to said scrap holding bunker.

5. The apparatus according to claim 4 wherein said scrap box dumper includes a crane.

6. The apparatus according to claim 1 wherein said scrap holding bunker further includes scrap shoving rams to facilitate movement of scrap along said converging side walls into said scrap delivery chute.

7. The apparatus according to claim 1 further including an extendable scrap chute section including coolant passageways for communicating with the charging opening in the electric arc furnace.

8. The apparatus according to claim 1 wherein said superstructure includes cradles at spaced apart locations for supporting said scrap delivery chute in a downwardly inclined direction along an elevated charging floor.

9. The apparatus according to claim 1 wherein said ram has a cross sectional configuration corresponding to the cross-sectional configuration of said scrap delivery chute for reciprocating movement there along.

10. The apparatus according to claim 9 wherein said drive includes a piston and cylinder assembly.

11. The apparatus according to claim 1 wherein said elongated scrap carrying trough includes a floor wall diverging vertically downward from the scrap holding bunker to said charging opening for the electric arc furnace.

12. The apparatus according to claim 1 wherein said elongated scrap carrying trough includes floor walls and roof walls diverging vertically downward and upwardly and side wall diverging horizontally from said scrap holding bunker to said charging opening for the electric arc furnace.

13. The apparatus according to claim 1 further including detectors responsive to advancement of scrap along said scrap chute for establishing predetermined amounts of scrap to be charged during consecutive intervals of time.

14. The apparatus according claim 13 wherein said detectors include limit switches providing signals to a controller for a drive to advance scrap along said scrap chute.

* * * * *